United States Patent [19]

Green

[11] Patent Number: 4,462,617
[45] Date of Patent: Jul. 31, 1984

[54] HIGH PRESSURE ROTARY COUPLING

[75] Inventor: Sidney J. Green, Salt Lake City, Utah

[73] Assignee: Terra Tek, Inc., Salt Lake City, Utah

[21] Appl. No.: 297,738

[22] Filed: Aug. 31, 1981

[51] Int. Cl.³ .............................................. F16L 55/00
[52] U.S. Cl. ....................................... 285/14; 285/45;
  285/93; 285/94; 285/98; 285/276; 285/351
[58] Field of Search ...................... 285/276, 93, 98, 45,
  285/281, 14, 351, 94

[56] References Cited

U.S. PATENT DOCUMENTS

| | | | |
|---|---|---|---|
| 2,113,647 | 4/1938 | Davidson et al. | 285/281 X |
| 2,790,632 | 4/1957 | Mellette | 285/276 X |
| 3,089,713 | 5/1963 | Scaramucci | 285/351 X |
| 3,148,922 | 9/1964 | Roessler | 285/276 X |
| 3,497,244 | 2/1970 | Grantom | 285/98 X |
| 4,221,408 | 9/1980 | Lochte et al. | 285/281 X |
| 4,335,827 | 10/1982 | Ehret | 285/98 |

FOREIGN PATENT DOCUMENTS

| | | | |
|---|---|---|---|
| 2329124 | 1/1974 | Fed. Rep. of Germany | 285/98 |
| 1191236 | 5/1970 | United Kingdom | 285/281 |

*Primary Examiner*—Dave W. Arola
*Attorney, Agent, or Firm*—M. Reid Russell; Robert R. Mallinckrodt

[57] ABSTRACT

The present invention in a rotary coupling or swivel is arranged for maintaining together, respectively, stationary and rotating pipes wherethrough a fluid under pressure is passed and involves an outer stationary body with an inner body journaled therein. The two bodies are held together by positioning a number of hardened balls within complimentary grooves formed, respectively, around the stationary body inner circumference and around the inner body outer circumference, the aligned grooves forming a track or race wherein the hardened balls roll freely. The hardened balls are dropped into the grooves through a port formed through the stationary body, holding the bodies together and functioning as a roller bearing to carry high thrust loads beyond the pressure loading. The coupling additionally includes a dual packing seal arrangement that, when installed between the stationary and rotating bodies will act as a barrier to fluid flow into the coupling and includes a visual flow indicator associated therewith that will indicate to an operator the failure of a primary seal. The dual packing seal arrangement is arranged to be easily installed without a necessity of fully separating the coupling bodies. Additionally, proximate ends of the coupling stationary and rotating bodies across where the fluid under pressure is passed are each tapered appropriately so as to provide a minimum pressure drop across the junction, and a plurality of radial bearings are preferably provided between the coupling bodies for supporting bending moments exerted thereacross.

7 Claims, 2 Drawing Figures

HIGH PRESSURE ROTARY COUPLING

BRIEF DESCRIPTION OF THE INVENTION

1. Field of the Invention

This invention relates generally to couplings or swivels for maintaining together, with a minimum pressure drop thereacross, stationary and rotating ends of high pressure transfer pipes wherethrough a fluid medium is circulated.

2. Prior Art

In operations that involve rotary drilling procedures, such as oil and gas well drilling, a drilling fluid under pressure is circulated through the drill string and returned up the bore hole for reuse. Such arrangement requires that such drilling fluids be under high pressure to provide a circulating flow to a drill bit and to lift the fluid out of the bore hole containing rock chips and the like therewith. Therefore, providing such pressurized fluid flow will generally entail pumping fluid under pressure through a stationary pipe and into a turning drilling string pipe, necessitating a coupling for joining the stationary and turning pipes to pass fluid therebetween with a minimum of pressure loss. From this need a number of unions and swivels have been developed, and some examples of such arrangements that incorporate dual packing seal configurations that are somewhat similar to that of the present invention, are shown in patents by Mauer, U.S. Pat. Nos. 3,736,007 and 3,752,507. These patents illustrate an arrangement of first or primary packing seal as a fluid flow barrier between stationary and rotating portions of a swivel, and provide a secondary or backup seal therewith for use on failure of the primary seal. Additionally, other patents dealing with plunger pumps, as for example U.S. Pat. Nos. 3,776,558; 3,785,659; and 3,914,752, likewise show dual seal packs, and U.S. Pat. No. 3,914,752 even provides an alarm indicator therewith that is responsive to fluid leakage past a primary packing seal thereof. While, like prior devices, the present invention employs a dual packing seal arrangement, the seals thereof are distinct from prior devices, as is the indicator arrangement therewith of a ball and seat configuration that operates to extend a colored post as a visual indicator of fluid presence between the primary and secondary seals.

Additional to the dual packing seal arrangement and the visual indicator therewith, the present invention, unlike any swivel or coupling within the knowledge of the inventor, provides for a unique drop-in ball locking configuration to join the coupling stationary and rotating bodies together, which drop-in ball locking configuration also functions as a thrust bearing.

Additional features of the present invention that are believed to be unique include opposite sloping of the coupling stationary and rotating body ends whereacross the fluid under pressure is passed, and the utilization of two spaced apart radial bearings for journaling the coupling bodies together and taking up bending moments thereacross. The opposite sloping ends of the coupling body limit an orifice effect thereat so as to minimize any pressure drop across the coupling.

SUMMARY OF THE INVENTION

It is, therefore, a general object of the present invention to provide a swivel or coupling for use in maintaining together stationary and rotating pipes that transfer fluid under pressure, which coupling includes stationary and rotating bodies or sections that are secured to the pipe ends with, in turn, the rotating body journaled to the stationary body.

It is an additional object of the present invention to journal the coupling stationary and rotating bodies together with a drop-in ball configuration where hardened balls are dropped through a port formed through the stationary body to rest in tracks formed as grooves in the opposite body surfaces providing thereby for a simplified coupling assembly and disassembly, the balls rolling freely in the grooves to function also as a thrust bearing.

It is an additional object of the present invention to provide a swivel or coupling that employs a unique dual packing seal arrangement for installation between the coupling stationary and rotating bodies, that includes a visual indicator to provide a visual display of a primary seal failure, which dual packing seal is arranged to be replaced without a necessity of fully disassembling the coupling.

It is an additional object of the present invention to provide a swivel or coupling designed to remove or limit an orifice effect across the coupling providing thereby for a transfer of fluid under high pressure with a minimum of pressure loss.

It is an additional object of the present invention to provide a swivel or coupling that employs a bearing arrangement for journaling coupling bodies together that will take up bending moments exerted thereacross to minimize friction forces exerted on the packing seals.

It is an additional object of the present invention to provide a swivel or coupling that is capable of efficiently transferring a high pressure fluid flow therethrough between stationary and rotating pipes with a minimum of pressure loss therein, that is inexpensive to construct and maintain, and is reliable and efficient in operation.

In accordance with the above objects, the present invention in a high pressure rotary coupling includes individual stationary and rotating bodies or sections arranged for coupling together, as will be described. The stationary body includes a stuffing box end cap for attachment to a stationary pipe wherethrough a flow of fluid under pressure is passed. The stuffing box end cap connects to stuffing box section of the stationary body wherein a stepped cavity is formed to receive a dual packing seal arrangement of the present invention. The dual packing seal arrangement is mounted therein such that the primary seal thereof will present a barrier to flow between the coupling stationary and rotating bodies at their junction wherethrough the high pressure fluid travels and the secondary seal will be held in place to act as a back-up seal on failure of the primary seal. The stationary body includes a port formed through the side wall to intersect the stuffing box packing seal cavity, between the primary and secondary seals, such that a fluid flow past the primary seal will travel into that port, filling a seat formed therein that contains a ball. Such fluid flow past the primary seal will force that ball upwardly to extend a post secured thereto beyond the outer wall of the stationary body as a visual indicator of the presence of fluid between the primary and secondary seals. The post is preferably colored to alert an operator of the failure of the primary seal. To facilitate changing of the dual packing seals the stuffing box end cap is arranged to be easily removed to expose the stepped cavity.

The coupling stationary body is preferably cylindrical and has the rotating body journaled to turn therein by a pair of radial bearings. Additionally, to provide for maintaining the coupling stationary and rotating bodies journaled together, the coupling stationary body has a circumferential groove formed around its inner circumference that will align with a like groove formed around the outer circumference of the rotating body, the aligned grooves constituting a track or race. The track or race is arranged to receive a number of hardened balls dropped therein through a port formed through the side of the stationary body. With the bodies aligned and a sufficient number of hardened balls dropped into the track or race, the coupling body will be held together, whereafter the port through the stationary body is plugged appropriately. So arranged, in addition to holding the coupling bodies together, the hardened balls will roll freely in the track or race to also function as a thrust bearing to take up high thrust forces exerted thereon beyond the pressure loading across the coupling.

As set out above, the coupling of the present invention preferably employs two spaced apart radial bearings, that are preferably roller bearings, to journal the coupling stationary and rotating bodies together. Spacing apart the two bearings tends to minimize the effect of an application of a bending load across coupling that would otherwise act upon a packing seal and cause undue wear thereon.

Additionally, the respective aligned portions of the coupling stationary and rotating bodies, whereacross the fluid flow passes, are sloped oppositely away from one another, to remove or limit an orifice effect at that junction, minimizing any pressure loss across the coupling.

BRIEF DESCRIPTION OF THE DRAWINGS

In the drawings that illustrate that which is presently regarded as the best mode for carrying out the invention.

DETAILED DESCRIPTION

Figure 1:
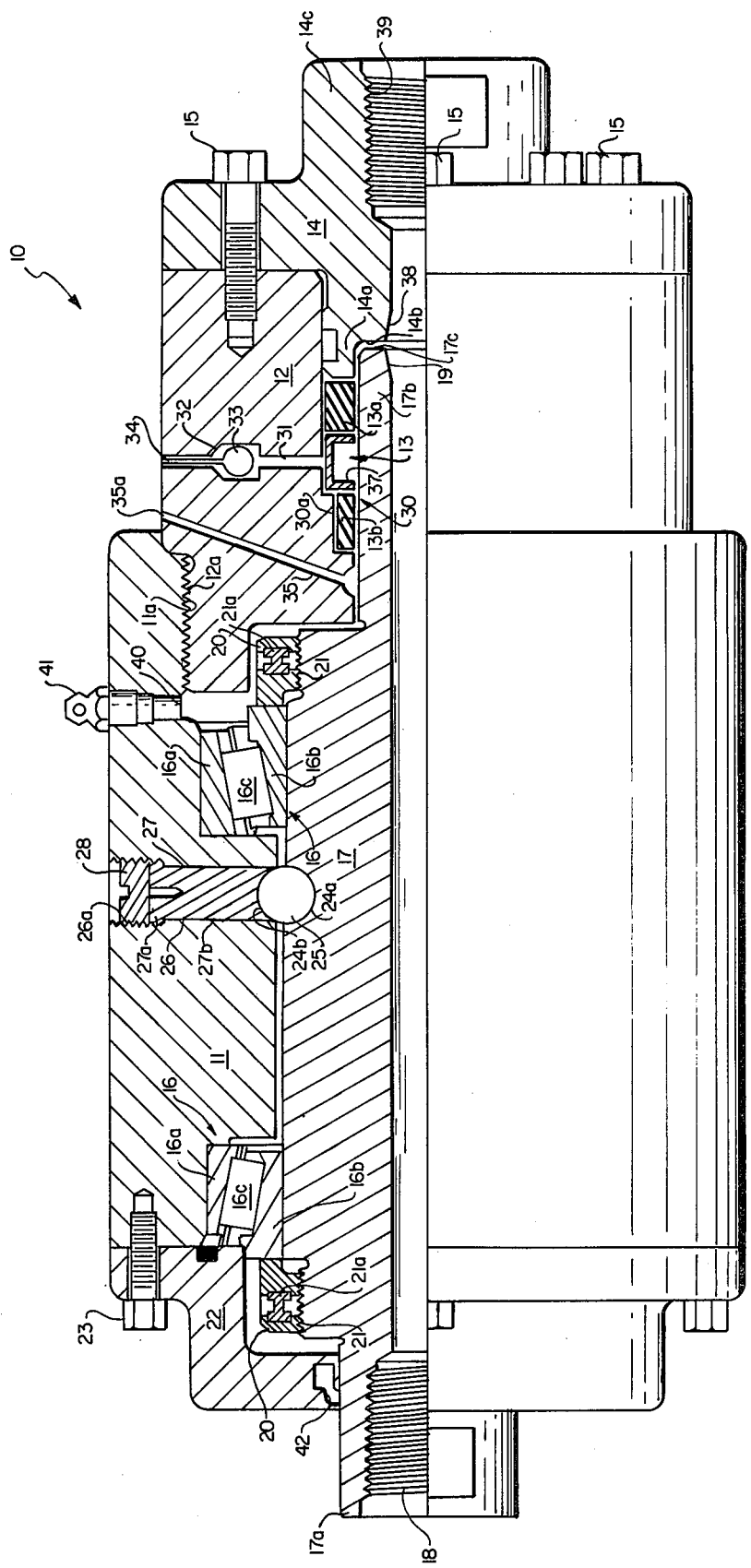
FIG. 1, is a profile view of a high pressure coupling of the present invention wherefrom a longitudinal section has been cut to expose the coupling interior.

Referring now to the drawings:

FIG. 1, shows a preferred side elevation view of a high pressure rotary coupling 10 of the present invention, hereinafter referred to as coupling, wherefrom a longitudinal section has been removed to expose the coupling interior.

Figure 2:
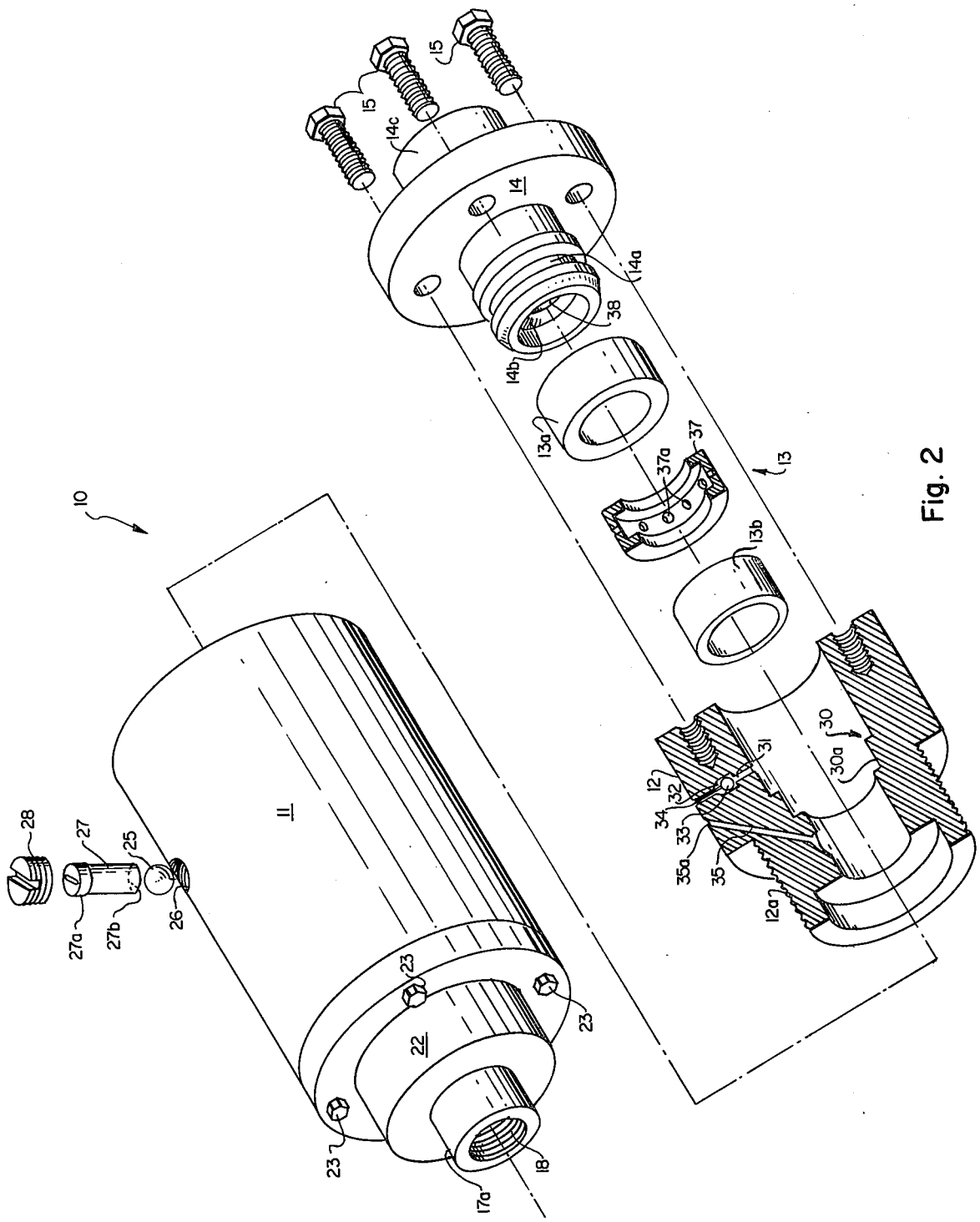
FIG. 2, is an exploded view of a stuffing box end cap and a sectionalized half of a stuffing box section exploded from an outer stationary body of the coupling, showing also a dual packing seal arrangement that includes a seal separator ring, aligned to fit within a cavity formed within the stuffing box section.

FIG. 2, shows certain of the coupling 10 components exploded away therefrom, to include a section of a stuffing box section 12, that has been turned out of a coupling stationary body section 11, that is hereinafter referred to as stationary body. FIG. 2 further shows a dual packing seal arrangement 13 hereinafter referred to as dual seals, aligned for installation within the stuffing box section 12, and includes a stuffing box end cap 14 aligned for installation thereover that is to be maintained thereto by fasteners, shown herein as bolts 15. Shown best in FIG. 1, coupling 10 includes stationary body 11 as a cylinder wherein is journaled by radial bearings 16, a coupling rotating body section 17, hereinafter referred to as rotating body. Rotating body 17 at end 17a thereof is internally threaded at 18 to receive a rotary or rotating pipe turned therein, which pipe, not shown, could be part of a conventional drill string, or the like. In turn, the opposite end of the rotating body 17 is footed at 17b to provide platform whereagainst dual seals 13 rest. The end 17c of the rotating body 17 that is opposite to a shoulder 14b of a hub 14a of the stuffing box end cap 14, as shown in FIG. 1, is sloped at 19 and the shoulder 14b is sloped oppositely at 38, to minimize an orifice effect thereat, as will be explained later herein.

Shown in FIG. 1, the pair of spaced apart radial bearings 16 are preferably roller bearings and each includes, additional to a roller 16c thereof, a tapered roller bearing cap 16a and a tapered roller bearing cone 16b. Of course, however, any appropriate bearing configuration could be so used to support turning of the rotating body 17 within stationary body 11. The radial bearings 16 are each preferably retained to the rotating body 17 by outer bearing retainers 20 that are conventional items and are turned over appropriately threaded portions 21 of rotating body 17, and are locked thereto by appropriate turning of a set screw 21a against the threads 21.

In assembling the stationary and rotating bodies 11 and 12 together, the radial bearings 16 are installed, as described, to the rotating body 17, shown in FIG. 1, and the stationary body 11 is aligned over the rotating body 17. Such alignment involves positioning over one another, complimentary grooves 24a and 24b that are formed, respectively, around the rotating body 17 outer circumference and the inner circumference of the stationary body 11. Grooves 14a and 14b, when so aligned, form a track or race for receiving a plurality of hardened balls 25 dropped therein through passage 26 formed through the side of the stationary body 11. The hardened balls rest against the sides of grooves 14a and 14b prohibiting the respective bodies from sliding over one another. Shown in FIG. 1, passage 26 is threaded at 26a to accommodate a plug 28 turned therein. The undersurface of plug 28 butts against to hold in place a ball race 27 that includes a threaded shoulder 27a that is turned into threads 26a to align concave head 27b thereof in the groove 24b to complete the groove, providing a continuous groove 24b. Hardened balls 25 are dropped through passage 26 into the track formed by grooves 24a and 24b, until that track is appropriately filled, whereafter the ball race 27 is fitted and aligned therein as plug 28 is turned thereover, as shown in FIG. 1. The grooves 24a and 24b, with groove 24b closed by contoured head 27b, function as a bearing track or race with the hardened balls 25 rolling freely therein. Thereby the stationary and rotating bodies 11 and 17 will be maintained together, the grooves and hardened balls rolling therein functioning as a thrust bearing to take up any high thrust forces beyond the pressure loading across the coupling.

Shown in FIG. 1, the stationary body 11 is internally threaded at 11a to accommodate the stuffing box section 12 turned therein on threads 12a. Stuffing box section 12 is therefore independently removable from the connected stationary and the rotating bodies 11 and 17. So arranged, should it become necessary to change the dual seals 13, as will be discussed in detail hereinbelow, such will not require disassembling the stationary and rotating bodies 11 and 17, which seals changing can be accomplished by turning the stuffing box section 12 and connected stuffing box end cap 14 out of the stationary body 11.

In FIG. 1, stuffing box section 12 is shown to include a longitudinal seal cavity 30 machined therefrom which cavity is stepped at 30a to receive a secondary seal 13b of the dual seals 13 fitting therein, as will be explained later herein. Additionally, a port 31 is shown to extend through that stuffing box section, communicating with packing seal cavity 30 to intersect the area therein forward of stepped portion 30a, between where the primary and secondary packing seals 13a and 13b of the dual seals, respectively, are seated as shown in FIG. 1. So arranged, the failure of primary packing seal 13a, whereby fluid would flow past that seal, would result in the fluid traveling into port 31. Port 31, as shown in FIG. 1, includes a seat formed therein that is shown as an enlarged chamber 32, wherein is contained a ball 33. Ball 33 will float on the fluid passing through the coupling 10, and thereby, fluid entering port 31 that travels into chamber 32 will lift ball 33, moving a post 34 secured thereto along port 31 to extend beyond stuffing box section 12. Post 34 is preferably colored appropriately to gain the attention of an operator, not shown. An operator, seeing post 34 extended is warned of the primary seal failure so that he can take appropriate action to change the dual seals 13. Pending such change, the secondary packing seal 13b will act as an effective barrier to fluid flow. Should, however, packing seal 13b also fail, the fluid flow would travel there past and into a bleed vent 35 that exhausts without the stationary body at 35a. Fluid leakage out of bleed vent 35 would, of course, also alert an operator to the failure of both primary and secondary seals of the dual seals 13. In FIGS. 1 and 2 of the dual seals 13 are shown as consisting of separate packing seals 13a and 13b, with the packing seal 13b shown as being somewhat narrower than packing seal 13a to fit within the stepped portion 30a of cavity 30. The individual packing seals 13a and 13b should be taken as being standard seals, with an example of a seal appropriate for use with the present invention being one manufactured by Johns Manville identified as a UNEPCA standard seal. The seals 13a and 13b are preferably held apart in the packing seal cavity 30 by a U-shaped channel ring 37.

Shown in FIG. 1, the U-shaped channel ring 37 butts against the stepped portion 30a of the cavity 30, holding the secondary seal 13b therein while being prohibited by that stepped portion from traveling into that seal. The channel ring 37 and the primary and secondary seals 13a and 13b constitute the dual seals 13 and are installed and removed as a unit within the packing seal cavity 30 above the rotating body foot 17b, as shown in FIG. 2. The U-shaped channel ring 37, shown best in FIG. 2, preferably includes the number of spaced apart holes 37a formed through the web thereof that provide for a fluid flow into the port 31, as described hereinabove.

Shown in the exploded view of FIG. 2, the dual seals 13 are aligned for installation in stuffing box section 12 whereafter a hub 14a of the stuffing box end cap 14 is fitted therein, closing off the cavity 30 and butting into an end face of the primary seal 13a. As shown in FIG. 1, the end of hub 14a fits snugly against the primary seal 13a and includes shoulder 14b that aligns with the end 17c of rotating body 17. So arranged, a fluid flow traveling through the coupling 10 will thereby pass across the area between the stationary hub shoulder 14b and turning rotating body end 17c, which flow could involve an orifice effect thereat. In practice it has been found that such orifice effect will be minimized or eliminated entirely by oppositely sloping the surfaces 19 and 38 away from the junction whereover the fluid flow travels providing thereby a low pressure drop coupling. So arranged, fluid will pass through the coupling 10 below the opposite slopes 19 and 38, with little or no orifice effect, minimizing any pressure loss across the coupling.

Similar to and on line with the threaded end 17a of the rotating body 17, for receiving a rotating pipe turned therein, a stuffing box end cap outer hub 14c is also preferably longitudinally threaded at 39 to receive an end of a stationary pipe, not shown, turned therein. The stationary pipe will pass fluid under pressure from a stationary source, such as a pump, not shown, that fluid flowing longitudinally through the coupling 10, and exhausting out end 17a of the rotating body 17 into a rotating pipe, not shown, connected thereto.

As was set out earlier herein, the present invention in a coupling 10 preferably involves two radial bearings 16 though, of course, one bearing only could be so utilized. Two radial bearings are, however, preferred to take up any bending moments exerted across the coupling 10 that would otherwise be transmitted into the dual seals 13 and would create undue wear on the individual seals 13a and 13b.

Additionally, as shown in FIG. 1, the present invention also preferably includes a grease port 40 for injecting, through a fitting 41, a lubricant between the stationary and rotating bodies 11 and 17, and a rod wiper 42 is preferably included with an end cap 22 that is secured by bolts 23 to stationary body 10. The rod wiper 42 provides a barrier to a transfer of foreign matter into the coupling where the stationary body and cap come into contact with the rotating body 17. The coupling also preferably incorporates standard O-ring seals, or the like, arranged appropriately between the stationary and rotating portions of the coupling, as required within the scope of this invention.

While a preferred embodiment of a high pressure rotary coupling 10 of the present invention has been shown and described herein, it should be understood that the present disclosure is made by way of example only and that variations thereto are possible without departing from the subject matter coming within the scope of the following claims, which claims I regard as my invention.

I claim:

1. A high pressure rotary coupling comprising, a stationary body portion arranged for connection to a stationary source of fluid under pressure and to accommodate a rotating body portion journaled thereto; a rotating body portion arranged for connection to a turning rotor and for journaling to said stationary body portion; bearing means for journaling said rotating body portion to said stationary body portion; means for maintaining said rotating body portion journaled to said stationary body during transfer of fluid under pressure therethrough, and as components of said stationary body portion, a stuffing box section and means for releasable coupling it to said stationary body portion as an end, and a stuffing box end cap that includes means for releasable connecting it to said stuffing box section end opposite to its coupling to said stationary body portion, and means for coupling it to said stationary source of fluid under pressure, the stuffing box section internally stepped to leave an open longitudinal section extending axially into said stuffing box section from the end cap end, which longitudinal section is walled by an axially extending end of said rotating body portion journaled within said stationary body portion, and is closed by said stuffing box end cap to form a packing seal cavity; primary and secondary packing seals for individually fitting in said packing seal cavity between said stuffing box section and axially extending end of said rotating body portion for sealing against a fluid flow therebetween; means for maintaining said primary and secondary packing seals in spaced apart relationship; and wherein said means for maintaining said rotating body portion journaled to said stationary body includes groove means formed in each said stationary and rotating body portion that, with said rotating body portion telescoped within said stationary body portion, align to form a continuous track to receive individual hardened balls installed therein; hardened balls for installation in said aligned grooves; port means wherethrough said hardened balls are passed into said aligned grooves from without the coupling, and closure means for closing off said port means, which closure means includes an arrangement for closing said stationary body portion groove.

2. A high pressure rotary coupling as recited in claim, 10 wherein
the port means extends through the stationary body portion and accommodates a plug turned and secured therein that has a contoured end that intersects and conforms to the groove formed around the stationary body to provide a continuous groove whereover the hardened balls will roll freely.

3. A high pressure rotary coupling as recited in claim 1, further including, a port arranged through the stuffing box section into the packing seal cavity between where the primary and secondary seals are arranged, which port includes a chamber wherein is positioned a ball that includes a post secured thereto, the post fitting in said port, which ball will float on fluid to extend the post beyond the stuffing box section; and the post is arranged appropriately to be readily noticeable.

4. A high pressure rotary coupling as recited in claim 1, wherein
the means for maintaining the spaced apart relationship of the primary and secondary seals is a U-shaped channel ring for arrangement between the primary and secondary seals that fits within the seal cavity and butts against the stepped portion thereof.

5. A high pressure rotary coupling as recited in claim 1, wherein the junction of the walls of the aligned portions of the respective stuffing box end cap and axially extending end of said rotating body portion, whereacross the fluid under pressure travels each slope downwardly at equal angles oppositely from said junction.

6. A high pressure rotary coupling as recited in claim 1, wherein
the bearing means consists of a pair of roller bearings.

7. A high pressure rotary coupling as recited in claim 3, further including a bleed vent arranged through the stuffing box section, exiting past the packing seal cavity.

* * * * *